(12) United States Patent
Wang et al.

(10) Patent No.: US 10,100,185 B2
(45) Date of Patent: *Oct. 16, 2018

(54) SOFT COPOLYMERS WITH HIGH IMPACT STRENGTH

(71) Applicant: BOREALIS AG, Vienna (AT)

(72) Inventors: Jingbo Wang, Linz (AT); Pauli Leskinen, Helsinki (FI); Johanna Lilja, Porvoo (FI); Markus Gahleitner, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/113,907

(22) PCT Filed: Feb. 3, 2015

(86) PCT No.: PCT/EP2015/052194
§ 371 (c)(1),
(2) Date: Jul. 25, 2016

(87) PCT Pub. No.: WO2015/117958
PCT Pub. Date: Aug. 13, 2015

(65) Prior Publication Data
US 2016/0347943 A1    Dec. 1, 2016

(30) Foreign Application Priority Data

Feb. 6, 2014 (EP) .................................... 14154119

(51) Int. Cl.
*C08L 23/16* (2006.01)
*C08L 23/14* (2006.01)
*C08F 210/06* (2006.01)

(52) U.S. Cl.
CPC .......... *C08L 23/142* (2013.01); *C08F 210/06* (2013.01); *C08L 2205/025* (2013.01); *C08L 2207/02* (2013.01); *C08L 2308/00* (2013.01)

(58) Field of Classification Search
CPC ...... C08F 210/06; C08F 2/001; C08F 210/16; C08F 2500/12; C08F 2500/17; C08F 2500/26; C08L 23/142; C08L 23/16; C08L 2205/025; C08L 2207/02; C08L 2308/00; C08L 2314/02

See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,691,043 A | 11/1997 | Keller et al. |
| 5,693,838 A | 12/1997 | Sangokoya et al. |
| 5,723,560 A | 3/1998 | Canich |
| 5,731,253 A | 3/1998 | Sangokoya |
| 5,731,451 A | 3/1998 | Smith et al. |
| 5,744,656 A | 4/1998 | Askham |
| 6,316,562 B1 | 11/2001 | Munck et al. |
| 6,322,883 B1 | 11/2001 | Williams |
| 6,365,682 B1 | 4/2002 | Alastalo et al. |
| 6,586,528 B1 | 7/2003 | Delaite et al. |
| 6,642,317 B1 | 11/2003 | Delaite et al. |
| 7,319,125 B2 | 1/2008 | Arjunan et al. |
| 7,342,078 B2 | 3/2008 | Schottek et al. |
| 7,354,979 B2 | 4/2008 | Brant et al. |
| 7,378,472 B2 | 5/2008 | Fell et al. |
| 7,429,634 B2 | 9/2008 | Brant et al. |
| 7,569,651 B2 | 8/2009 | Schottek et al. |

(Continued)

FOREIGN PATENT DOCUMENTS

| | | |
|---|---|---|
| CN | 101563226 A | 11/1997 |
| CN | 1248198 A | 3/2000 |

(Continued)

OTHER PUBLICATIONS

"Glossary of Basic Terms in Polymer Science (IUPAC Recommendations 1996)," *Pure Appl. Chem.*, 68(8):1591-1595 (1996).

(Continued)

*Primary Examiner* — Nathan M Nutter
(74) *Attorney, Agent, or Firm* — Leydig, Voit & Mayer, Ltd.

(57) ABSTRACT

The present invention is directed to a new heterophasic propylene copolymer (RAHECO) and an injection molded article comprising the heterophasic propylene copolymer (RAHECO) as well as a thin wall packaging comprising the heterophasic propylene copolymer (RAHECO). The present invention is further directed to the use of the heterophasic propylene copolymer (RAHECO) for improving the toughness of an injection molded article.

19 Claims, 1 Drawing Sheet

(56) References Cited

U.S. PATENT DOCUMENTS

| | | | |
|---|---|---|---|
| 8,709,561 B2 | 4/2014 | Bernreitner et al. |
| 8,779,062 B2 | 7/2014 | Paavilainen et al. |
| 8,889,792 B2 | 11/2014 | Paavilainen et al. |
| 9,181,423 B2 | 11/2015 | Kock et al. |
| 9,243,137 B2 | 1/2016 | Reichelt et al. |
| 9,828,698 B2 | 11/2017 | Wang et al. |
| 2003/0149199 A1 | 8/2003 | Schottek et al. |
| 2004/0033349 A1 | 2/2004 | Henderson |
| 2004/0122191 A1 | 6/2004 | Arjunan et al. |
| 2004/0127654 A1 | 7/2004 | Brant et al. |
| 2005/0136274 A1 | 6/2005 | Hamulski et al. |
| 2005/0187367 A1 | 8/2005 | Hori et al. |
| 2005/0200046 A1 | 9/2005 | Breese |
| 2006/0020096 A1 | 1/2006 | Schottek et al. |
| 2006/0034777 A1 | 2/2006 | Mahling et al. |
| 2006/0155080 A1 | 7/2006 | Fell et al. |
| 2006/0182987 A1 | 8/2006 | Yu et al. |
| 2006/0211801 A1 | 9/2006 | Miller et al. |
| 2006/0211832 A1 | 9/2006 | Brant et al. |
| 2007/0235896 A1 | 10/2007 | McLeod et al. |
| 2008/0207835 A1 | 8/2008 | Vestberg et al. |
| 2008/0214767 A1 | 9/2008 | Mehta et al. |
| 2010/0029883 A1 | 2/2010 | Krajete et al. |
| 2010/0081760 A1 | 4/2010 | Rhee et al. |
| 2010/0099824 A1 | 4/2010 | Helland et al. |
| 2010/0304062 A1 | 12/2010 | Daviknes et al. |
| 2011/0031645 A1 | 2/2011 | Kuettel et al. |
| 2012/0189830 A1 | 7/2012 | Niepelt et al. |
| 2012/0220727 A1 | 8/2012 | Klimke et al. |
| 2013/0030121 A1 | 1/2013 | Alamo et al. |
| 2013/0045862 A1 | 2/2013 | Valonen et al. |
| 2013/0116393 A1 | 5/2013 | Haikarainen et al. |
| 2013/0167486 A1 | 7/2013 | Aarnio et al. |
| 2013/0178573 A1 | 7/2013 | Paavilainen et al. |
| 2013/0203908 A1 | 8/2013 | Kock et al. |
| 2013/0203931 A1 | 8/2013 | Paavilainen et al. |
| 2013/0236668 A1 | 9/2013 | Bernreitner et al. |
| 2013/0267660 A1* | 10/2013 | Leskinen et al. | C08F 297/08 525/240 |
| 2014/0005324 A1 | 1/2014 | Reichelt et al. |
| 2014/0155547 A1* | 6/2014 | Gahleitner et al. | C08F 210/06 525/53 |
| 2014/0316070 A1* | 10/2014 | Sandholzer et al. | C08F 210/06 525/240 |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1* | 12/2016 | Wang et al. | C08J 5/18 |
| 2017/0009068 A1 | 1/2017 | Kahlen et al. |
| 2017/0029980 A1 | 2/2017 | Wang et al. |
| 2017/0066912 A1 | 3/2017 | Wang et al. |
| 2017/0137617 A1 | 5/2017 | Wang et al. |
| 2017/0145199 A1 | 5/2017 | Wang et al. |

FOREIGN PATENT DOCUMENTS

| | | |
|---|---|---|
| CN | 1267310 A | 9/2000 |
| CN | 1684988 A | 10/2005 |
| CN | 1701081 A | 11/2005 |
| CN | 1823106 A | 8/2006 |
| CN | 101573231 A | 11/2009 |
| CN | 101772376 A | 7/2010 |
| CN | 101903103 A | 12/2010 |
| CN | 102076760 A | 5/2011 |
| CN | 102597098 A | 7/2012 |
| CN | 102869719 A | 1/2013 |
| CN | 103068574 A | 4/2013 |
| CN | 103080212 A | 5/2013 |
| CN | 103347951 A | 10/2013 |
| EP | 0 045 977 B1 | 1/1987 |
| EP | 0 260 130 A1 | 3/1988 |
| EP | 0 279 586 A2 | 8/1988 |
| EP | 0 045 975 B1 | 4/1989 |
| EP | 0 045 976 B1 | 11/1989 |
| EP | 0 361 493 A1 | 4/1990 |
| EP | 0 423 101 A2 | 4/1991 |
| EP | 0 488 595 A1 | 6/1992 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594 218 A1 | 4/1994 |
| EP | 0 279 586 B1 | 5/1994 |
| EP | 0 622 380 A1 | 11/1994 |
| EP | 0 045 977 B2 | 3/1995 |
| EP | 0 645 417 A1 | 3/1995 |
| EP | 0 728 769 A1 | 8/1996 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 028 984 B1 | 7/2001 |
| EP | 1 359 171 A1 | 11/2003 |
| EP | 1 376 516 A1 | 1/2004 |
| EP | 1 452 630 A1 | 9/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 883 080 A1 | 1/2008 |
| EP | 1 892 264 A1 | 2/2008 |
| EP | 1 923 200 A1 | 5/2008 |
| EP | 1 941 997 A1 | 7/2008 |
| EP | 1 941 998 A1 | 7/2008 |
| EP | 1 947 143 A1 | 7/2008 |
| EP | 1 990 353 A1 | 11/2008 |
| EP | 2 014 714 A1 | 1/2009 |
| EP | 2 062 936 A1 | 5/2009 |
| EP | 2 065 087 A1 | 6/2009 |
| EP | 2 075 284 A1 | 7/2009 |
| EP | 2 174 980 A1 | 4/2010 |
| EP | 2 251 361 A1 | 11/2010 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 | 2/2012 |
| EP | 1 358 252 B1 | 4/2012 |
| EP | 2 308 923 B1 | 5/2012 |
| EP | 2 487 203 A1 | 8/2012 |
| EP | 2 532 687 A2 | 12/2012 |
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 666 818 A1 | 11/2013 |
| JP | S60-147464 A | 8/1985 |
| JP | 2013-525531 A | 6/2013 |
| JP | 2013-525532 A | 6/2013 |

(56) References Cited

FOREIGN PATENT DOCUMENTS

| | | |
|---|---|---|
| JP | 2015-503647 A | 2/2015 |
| WO | WO 1987/007620 A1 | 12/1987 |
| WO | WO 1992/012182 A1 | 7/1992 |
| WO | WO 1992/013029 A1 | 8/1992 |
| WO | WO 1992/019653 A1 | 11/1992 |
| WO | WO 1992/019658 A1 | 11/1992 |
| WO | WO 1992/019659 A1 | 11/1992 |
| WO | WO 1992/021705 A1 | 12/1992 |
| WO | WO 1993/011165 A1 | 6/1993 |
| WO | WO 1993/011166 A1 | 6/1993 |
| WO | WO 1993/019100 A1 | 9/1993 |
| WO | WO 1994/010180 A1 | 5/1994 |
| WO | WO 1994/014856 A1 | 7/1994 |
| WO | WO 1995/012622 A1 | 5/1995 |
| WO | WO 1995/032994 A1 | 12/1995 |
| WO | WO 1997/010248 A1 | 3/1997 |
| WO | WO 1997/014700 A1 | 4/1997 |
| WO | WO 1997/028170 A1 | 8/1997 |
| WO | WO 1997/036939 A1 | 10/1997 |
| WO | WO 1998/012234 A1 | 3/1998 |
| WO | WO 1998/016359 A1 | 4/1998 |
| WO | WO 1998/038041 A1 | 9/1998 |
| WO | WO 1998/040331 A1 | 9/1998 |
| WO | WO 1998/046616 A1 | 10/1998 |
| WO | WO 1998/047929 A1 | 10/1998 |
| WO | WO 1998/049208 A1 | 11/1998 |
| WO | WO 1998/056831 A1 | 12/1998 |
| WO | WO 1998/058971 A1 | 12/1998 |
| WO | WO 1998/058976 A1 | 12/1998 |
| WO | WO 1998/058977 A1 | 12/1998 |
| WO | WO 1999/010353 A1 | 3/1999 |
| WO | WO 1999/012981 A1 | 3/1999 |
| WO | WO 1999/019335 A1 | 4/1999 |
| WO | WO 1999/024478 A1 | 5/1999 |
| WO | WO 1999/024479 A1 | 5/1999 |
| WO | WO 1999/033842 A1 | 7/1999 |
| WO | WO 1999/041290 A1 | 8/1999 |
| WO | WO 2000/034341 A2 | 6/2000 |
| WO | WO 2000/068315 A1 | 11/2000 |
| WO | WO 2001/048034 A2 | 7/2001 |
| WO | WO 2001/058970 A1 | 8/2001 |
| WO | WO 2001/070395 A2 | 9/2001 |
| WO | WO 2002/002576 A1 | 1/2002 |
| WO | WO 2002/051912 A1 | 7/2002 |
| WO | WO 2002/057342 A2 | 7/2002 |
| WO | WO 2003/000754 A1 | 1/2003 |
| WO | WO 2003/000755 A2 | 1/2003 |
| WO | WO 2003/000756 A1 | 1/2003 |
| WO | WO 2003/000757 A1 | 1/2003 |
| WO | WO 2003/051934 A2 | 6/2003 |
| WO | WO 2003/054035 A1 | 7/2003 |
| WO | WO 2003/066698 A1 | 8/2003 |
| WO | WO 2003/082879 A1 | 10/2003 |
| WO | WO 2004/000899 A1 | 12/2003 |
| WO | WO 2004/013193 A2 | 2/2004 |
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2009/092691 A1 | 7/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/052263 A1 | 5/2010 |
| WO | WO 2010/053644 A1 | 5/2010 |
| WO | WO 2010/082943 A1 | 7/2010 |
| WO | WO 2010/115878 A1 | 10/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/117032 A1 | 9/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/004507 A1 | 1/2013 |
| WO | WO 2013/007650 A1 | 1/2013 |
| WO | WO 2013/010879 A1 | 1/2013 |
| WO | WO 2013/050119 A1 | 4/2013 |
| WO | WO 2013/092615 A1 | 6/2013 |
| WO | WO 2013/092620 A1 | 6/2013 |
| WO | WO 2013/092624 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |
| WO | WO 2015/117958 A1 | 8/2015 |
| WO | WO 2015/121160 A1 | 8/2015 |
| WO | WO 2015/177094 A1 | 11/2015 |

OTHER PUBLICATIONS

"MDO Film—Oriented PE and PP packaging film," IN0128/GB FF 2004 10, Borealis A/S (2004).

Abiru et al., "Microstructural Characterization of Propylene-Butene-1 Copolymer Using Temperature Rising elution Fractionation," *J. Appl. Polymer Sci* 68:1493-1501 (1998).

Atwood, "Chapter 6: Anionic and Cationic Organoaluminum Compounds," *Coord. Chem. Alum.*, VCH, New York, NY, pp. 197-232 (1993).

Britovsek et al., "The Search for New-Generation Olefin Polymerization Catalysts: Life beyond Metallocenes," *Angew. Chem, Int. Ed.*, vol. 38(4), pp. 428-447 (1999).

Busico et al., "Alk-1-ene Polymerization in the Presence of a Monocyclopentadienyl Zirconium(IV) Acetamidinate Catalyst: Microstructural and Mechanistic Insights$^a$," *Macromol. Rapid Commun.* 28:1128-1134 (2007).

Busico et al., "Full Assignment of the $^{13}$C NMR Spectra of Regioregular Polypropylenes: Methyl and Methylene Region," *Macromolecules* 30:6251-6263 (1997).

Busico et al., "Microstructure of polypropylene," *Prog. Polym. Sci.* 26:443-533 (2001).

Castignolles et al., "Detection and quantification of branching in polyacrylates by size-exclusion chromatography (SEC) and melt-state $^{13}$C NMR spectroscopy," *Polymer*, 50(11):2373-2383, (2009).

(56) References Cited

OTHER PUBLICATIONS

Cheng, "$^{13}$C NMR Analysis of Ethylene-Propylene Rubbers," *Macromolecules* 17:1950-1955 (1984).
Cimmino et al., "Thermal and mechanical properties of isotactic random propylene-butene-1 copolymers," *Polymer* 19:1222-1223 (1978).
Crispino et al., "Influence of Composition on the Melt Crystallization of Isotactic Random Propylene/1-Butene Copolymers," *Makromol. Chem.* 181:1747-1755 (1980).
Filip et al., "Heteronuclear decoupling under fast MAS by a rotor-synchronized Hahn-echo pulse train," *J. Magnet. Reson.* 176:239-243 (2005).
Fujiyama et al., "Effect of Molecular Parameters on the Shrinkage of Injection-Molded Polypropylene," *J. Appl. Polym. Sci.* 22:1225-1241 (1978).
Gahleitner et al., "Nucleation of Polypropylene Homo- and Copolymers," *International Polymer Processing* 26(1):2-20 (2011).
Galli et al., "Technology: driving force behind innovation and growth of polyolefins," *Prog. Polym. Sci.* 26:1287-1336 (2001).
Grein et al., "Impact Modified Isotatic Polypropylene with Controlled Rubber Intrinsic Viscosities: Some New Aspects About Morphology and Fracture," *J. Appl. Polymer Sci.,* 87:1702-1712 (2003).
Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198-S208 (2007).
Holbrey et al., "Liquid clathrate formation in ionic liquid-aromatic mixtures," *Chem. Comm.*, 2003, pp. 476-477.
Kakugo et al., "$^{13}$C NMR Determination of Monomer Sequence Distribution in Ethylene-Propylene Copolymers Prepared with δ-TiCl$_3$—Al(C$_2$H$_5$)$_2$Cl," *Macromolecules* 15:1150-1152 (1982).
Klimke et al., "Optimisation and Application of Polyolefin Branch Quantification by Melt-State $^{13}$C NMR Spectroscopy," *Macromol. Chem. Phys.* 207(4):382-395 (2006).
Koch et al., "Evaluation of scratch resistance in multiphase PP blends," *Polymer Testing* 26: 927-936 (2007).
McAuley et al., "On-line Inference of Polymer Properties in an Industrial Polyethylene Reactor," *AIChE Journal*, vol. 37, No. 6, pp. 825-835 (1991).
Myhre et al., "Oriented PE films—Expanding Opportunities with Borstar® PE," Maack Speciality Films, pp. 1-10 (2001).
Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).
Periodic Table (IUPAC Jun. 22, 2007).
*Plastics Additives Handbook*, 5th edition, Hans Zweifel, Editor, Hanser Publishers, Munich, pp. 871-873 (2001).
*Plastics Additives Handbook*, 5th edition, Hans Zweifel, Editor, Hansel Publishers, Munich, pp. 956-965 (2001).

Pollard et al., "Observation of Chain Branching in Polyethylene in the Solid State and Melt via 13C NMR Spectroscopy and Melt NMR Relaxation Time Measurements," *Macromolecules,* 37(3):813-825 (2004).
*Propylene Handbook*, 2$^{nd}$ Edition, Chapter 7.2.2 "Oriented Films," pp. 405-415, Nello Pasquini, Editor, Hanser (2005).
Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).
Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).
Resconi et al., "Highly Regiospecific Zirconocene Catalysts for the Isospecific Polymerization of Propene," *JACS* 120(101:2308-2321 (1998).
Resconi et al., "Selectivity in Propene Polymerization with Metallocene Catalysts," *Chem. Rev.* 100(4):1253-1345 (2000).
Singh et al., "Triad sequence determination of ethylene-propylene copolymers—application of quantitative $^{13}$C NMR," *Polymer Testing* 28(5):475-479 (2009).
Spaleck et al., "The Influence of Aromatic Substituents on the Polymerization Behavior of Bridged Zirconocene Catalysts," *Organometallics* 13:954-963 (1994).
Spear et al., "Liquid Clathrates," *Encyclopedia of Supramolecular Chemistry*, J.L. Atwood and J.W. Steed (Eds.); Marcel Dekker: New York, pp. 804-808 (2004).
Wang et al., "Structural Analysis of Ethylene/Propylene Copolymers Synthesized with a Constrained Geometry Catalyst," *Macromolecules* 33:1157-1162 (2000).
Zhou et al., "A new decoupling method for accurate quantification of polyethylene copolymer composition and triad sequence distribution with $^{13}$C NMR," *J. Magnet. Reson.* 187:225-233 (2007).
"Polyethylene Lumicene® mPE M5510 EP," Total Refining & Chemicals, Total Ecosolutions, Belgium, Aug. 2013 (2 pgs.).
European Patent Office, International Search Report in International Application No. PCT/EP2015/052194 (dated Mar. 31, 2015).
European Patent Office, Written Opinion in International Application No. PCT/EP2015/052194 (dated Mar. 31, 2015).
International Bureau of WIPO, International Preliminary Report on Patentability in International Application No. PCT/EP2015/052194 (dated Aug. 9, 2016).
State Intellectual Property Office of the People's Republic of China, Office Action issued in Chinese Application No. 201580005776.5 (dated May 10, 2017).
Japanese Patent Office, Notice of Reasons for Rejection issued in Japanese Application No. 2016-544667 (dated Jul. 25, 2017).
Paulik et al., "Weiche, zähelastische PP-Copolymere" (Flexible, Tough and Resilient PP Copolymers), *Kunststoffe* 86(7): 1144-1147 (1996).

\* cited by examiner

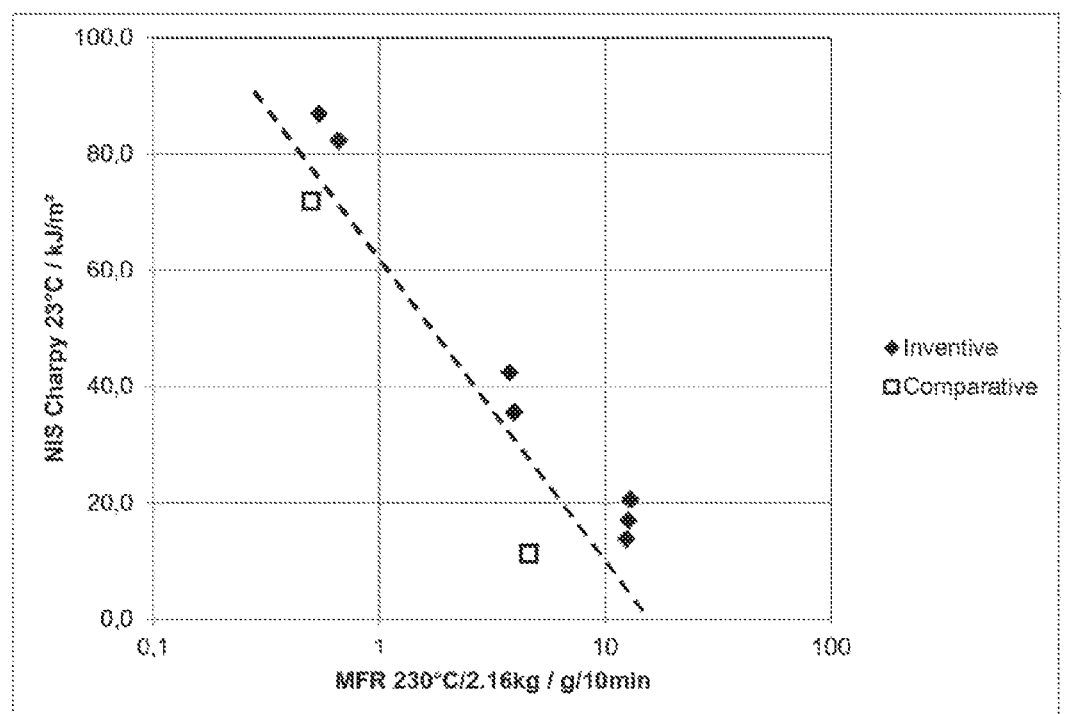

SOFT COPOLYMERS WITH HIGH IMPACT STRENGTH

CROSS-REFERENCE TO RELATED APPLICATIONS

This patent application is the U.S. national phase of International Application No. PCT/EP2015/052194, filed on Feb. 3, 2015, which claims the benefit of European Patent Application No. 14154119.3, filed Feb. 6, 2014, the disclosures of which are incorporated herein by reference in their entireties for all purposes.

The present invention is directed to a new heterophasic propylene copolymer (RAHECO) and an injection molded article comprising the heterophasic propylene copolymer (RAHECO) as well as a thin wall packaging container comprising the heterophasic propylene copolymer (RAHECO). The present invention is further directed to the use of the heterophasic propylene copolymer (RAHECO) for improving the toughness of an injection molded article.

In the field of thin-wall packaging it is of great importance to have a well flowing material with good mechanical properties, i.e. a high tensile modulus and good impact strength. The good flowability is needed for achieving a good processability in various manufacturing methods of articles, e.g. in the injection molding processes, thereby allowing the high production speed required in this mass production market. The mechanical properties are also critical in view of the thin-walled articles. Particularly, in the field of containers there is a need to hold the content such as food contained therein as well as having sufficient stiffness to be stacked. Furthermore, the materials should also withstand mechanical impact damage, which is frequently incurred by e.g. dropping the articles.

Still further, also the optical properties such as the haze should be acceptable. Particularly, a good balance between optical and mechanical properties such as toughness and haze is desirable.

In this regard, it is well known that the toughness of a heterophasic systems can be improved by increasing the amount as well as the molecular weight, i.e. the intrinsic viscosity, of the elastomeric propylene copolymer (E) dispersed in the matrix (M) of the heterophasic propylene copolymer.

However, there is still a need in the art for providing a heterophasic system having improved mechanical properties such as toughness in combination with good optical properties are required.

Thus, it is an object of the present invention to provide a soft heterophasic propylene copolymer with an optimized or improved balance between mechanical and optical properties.

BRIEF DESCRIPTION OF THE DRAWING

The FIGURE compares a property of certain inventive examples set forth in Table 1 to that of the comparative examples. The FIGURE shows Charpy notched impact strength values as a function of Melt Flow Rates.

DETAILED DESCRIPTION OF THE INVENTION

The finding of the present invention is to provide a heterophasic propylene copolymer which must be produced in the presence of a Ziegler-Natta catalyst containing an internal donor (ID) not belonging to the class of phthalic acid esters. With such a catalyst a heterophasic propylene copolymer can be produced having an optimized or improved toughness in combination with good optical properties, such as haze.

Accordingly, the present invention is directed to a heterophasic propylene copolymer (RAHECO), said heterophasic propylene copolymer (RAHECO) comprises a matrix (M) being a random propylene copolymer (R-PP) and an elastomeric propylene copolymer (E) dispersed in said matrix (M), wherein the heterophasic propylene copolymer (RAHECO) has a) a melt flow rate $MFR_2$ (230° C.) measured according to ISO 1133 in the range of 0.3 to 20.0 g/10 min,
b) a xylene cold soluble content (XCS) determined according ISO 16152 (25° C.) in the range of 16.0 to 50.0 wt.-%,
c) a total comonomer content in the range of 11.5 to 21.0 mol-%, and wherein further the heterophasic propylene copolymer (RAHECO)
(i) is free of phthalic acid esters as well as their respective decomposition products and/or
(ii) has a Charpy notched impact strength as defined by in-equation (III)

$$NIS > 60.0 - 23.0 \times \ln(MFR) \quad (III)$$

wherein
"NIS" is the Charpy notched impact strength according to ISO 179-1eA:2000 at 23° C. [in $kJ/m^2$] of the heterophasic propylene copolymer (RAHECO), and "MFR" is the $MFR_2$ (230° C./2.16 kg) [in g/10 min] of the heterophasic propylene copolymer (RAHECO).

It has surprisingly been found out that such heterophasic propylene copolymer (RAHECO) has optimized or improved mechanical properties such as toughness in combination with good optical properties, such as haze.

In one embodiment of the present invention, the xylene cold soluble content (XCS) has
i) a comonomer content in the range of 36.5 to 50.0 mol-%, and/or
ii) an intrinsic viscosity (IV) determined according to DIN ISO 1628/1, (in Decalin at 135° C.) in the range of 2.0 to 4.5 dl/g.

In another embodiment of the present invention, the random propylene copolymer (R-PP) has
i) before vis-breaking a melt flow rate $MFR_2$ (230° C.) measured according to ISO 1133 in the range of 3.0 to 8.0 g/10 min, and/or
ii) a comonomer content in the range of 4.4 to 9.0 mol-%.

In still another embodiment of the present invention, the xylene cold insoluble fraction (XCI) has a relative content of isolated to block ethylene sequences (I(E)) in the range of 50.0 to 65.0%, like 53.0 to 65.0%, wherein the I(E) content is defined by equation (I)

$$I(E) = \frac{fPEP}{(fEEE + fPEE + fPEP)} \times 100 \quad (I)$$

wherein
I(E) is the relative content of isolated to block ethylene sequences [in %];
fPEP is the mol fraction of propylene/ethylene/propylene sequences (PEP) in the xylene cold insoluble fraction (XCI) of the heterophasic propylene copolymer (RAHECO);
fPEE is the mol fraction of propylene/ethylene/ethylene sequences (PEE) and of ethylene/ethylene/propylene sequences (EEP) in the xylene cold insoluble fraction (XCI) of the heterophasic propylene copolymer (RAHECO); fEEE is the mol fraction of ethylene/ethylene/ethylene sequences (EEE) in the xylene cold insoluble fraction (XCI) of the heterophasic propylene copolymer (RAHECO), wherein all sequence concentrations being based on a statistical triad analysis of $^{13}$C-NMR data.

In yet another embodiment of the present invention, the comonomers of the random propylene copolymer (R-PP) and/or the comonomers of the elastomeric propylene copolymer (E) are ethylene and/or $C_4$ to $C_8$ α-olefin.

In one embodiment of the present invention, the heterophasic propylene copolymer (RAHECO) comprises 65.0 to 90.0 wt.-%, like 75.0 to 90.0 wt.-%, more preferably 65.0 to 88.0 wt.-%, like 75 to 88.0 wt.-%, based on the total weight of the heterophasic propylene copolymer (RAHECO), of the random propylene copolymer (R-PP) and 10.0 to 35.0 wt.-%, like 10.0 to 25.0 wt.-%, more preferably 12.0 to 35.0 wt.-%, like 12.0 to 25.0 wt.-%, based on the total weight of the heterophasic propylene copolymer (RAHECO), of the elastomeric propylene copolymer (E).

In another embodiment of the present invention, the heterophasic propylene copolymer (RAHECO) has been visbroken. It is preferred that the heterophasic propylene copolymer (RAHECO) has been visbroken with a visbreaking ratio (VR) as defined by in-equation (II)

$$1.5 \le \frac{MFRfinal - MFRinitial}{MFRinitial} \le 30.0 \quad (II)$$

wherein

"MFRfinal" is the $MFR_2$ (230° C./2.16 kg) of the heterophasic propylene copolymer (RAHECO) after visbreaking and "MFRinitial" is the $MFR_2$ (230° C./2.16 kg) of the heterophasic propylene copolymer (RAHECO) before visbreaking In one embodiment of the present invention, the heterophasic propylene copolymer (RAHECO) has been polymerized in the presence of
a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester;
b) optionally a co-catalyst (Co), and
c) optionally an external donor (ED).

It is preferred that a) the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate; b) the molar-ratio of co-catalyst (Co) to external donor (ED) [Co/ED] is 5 to 45.

In yet another embodiment of the present invention, the heterophasic propylene copolymer (RAHECO) comprising a matrix (M) being a random propylene copolymer (R-PP) and an elastomeric propylene copolymer (E) dispersed in said matrix (M) is produced in a multistage process comprising at least two reactors connected in series.

It is preferred that
(a) in a first reactor propylene and ethylene and/or $C_4$ to $C_8$ α-olefin are polymerized obtaining a first propylene copolymer fraction (R-PP1),
(b) transferring said first propylene copolymer fraction (R-PP1) in a second reactor,
(c) polymerizing in said second reactor in the presence of the first propylene copolymer fraction (R-PP1) propylene and ethylene and/or $C_4$ to $C_8$ α-olefin obtaining a second propylene copolymer fraction (R-PP2), said first propylene copolymer fraction (R-PP1) and said second propylene copolymer fraction (R-PP2) form the matrix (R-PP),
(d) transferring said matrix (M) in a third reactor,
(e) polymerizing in said third reactor in the presence of the matrix (M) propylene and ethylene and/or $C_4$ to $C_8$ α-olefin obtaining an elastomeric propylene copolymer (E), said matrix (M) and said elastomeric propylene copolymer (E) form the heterophasic propylene copolymer (RAHECO).

In one embodiment of the present invention, the heterophasic propylene copolymer (RAHECO) has a flexural modulus measured according to ISO 178 in the range of 300 to 700 MPa.

The present invention is also directed to an injection molded article comprising the heterophasic propylene copolymer (RAHECO).

The present invention is further directed to a thin wall packaging, preferably a thin wall packaging made by injection molding, comprising the heterophasic propylene copolymer (RAHECO).

The present invention is even further directed to an use of the heterophasic propylene copolymer (RAHECO) for improving the toughness of an injection molded article, wherein the improvement is accomplished when the article has a Charpy notched impact strength as defined by in-equation (III)

$$NIS > 60.0 - 23.0 \times \ln(MFR) \quad (III)$$

wherein

"NIS" is the Charpy notched impact strength according to ISO 179-1eA:2000 at 23° C. [in kJ/m$^2$] of the heterophasic propylene copolymer (RAHECO), and "MFR" is the $MFR_2$ (230° C./2.16 kg) [in g/10 min] of the heterophasic propylene copolymer (RAHECO).

In the following, the present invention is described in more detail.

The instant heterophasic propylene copolymer (RAHECO) is especially featured by its specific mechanical and optical properties.

Accordingly, it is preferred that the heterophasic propylene copolymer (RAHECO) has a flexural modulus measured according to ISO 178 in the range of 300 to 700 MPa. For example, the heterophasic propylene copolymer (RAHECO) has a flexural modulus measured according to ISO 178 in the range of 330 to 650 MPa or in the range of 350 to 600 MPa.

In particular, the instant heterophasic propylene copolymer (RAHECO) features an improved toughness, which can be preferably described as function of processability. Thus, the instant heterophasic propylene copolymer (RAHECO) preferably features a Charpy notched impact strength as defined by in-equation (III), more preferably by in-equation (IIIa), still more preferably by in-equation (IIIb), $$NIS > 60.0 - 23.0 \times \ln(MFR) \quad (III)$$

$$NIS > 63.0 - 23.0 \times \ln(MFR) \quad (IIIa)$$

$$NIS > 65.0 - 23.0 \times \ln(MFR) \quad (IIIb)$$

wherein

"NIS" is the Charpy notched impact strength according to ISO 179-1eA:2000 at 23° C. [in kJ/m$^2$] of the heterophasic propylene copolymer (RAHECO), and "MFR" is the MFR$_2$ (230° C./2.16 kg) [in g/10 min] of the heterophasic propylene copolymer (RAHECO).

For example, the instant heterophasic propylene copolymer (RAHECO) features a Charpy notched impact strength according to ISO 179-1eA:2000 at 23° C. in the range of 5.0 to 90.0 kJ/m$^2$, preferably in the range of 10.0 to 90.0 kJ/m$^2$.

With regard to the optical properties it is preferred that the heterophasic propylene copolymer (RAHECO) has a haze according to ASTM D 1003-00 measured on a 1 mm thick injection molded specimen in the range of 78.0 to 100.0%, preferably in the range of 80.0 to 100.0%.

In one embodiment of the present invention, the heterophasic propylene copolymer (RAHECO) has
a) a flexural modulus measured according to ISO 178 in the range of 300 to 700 MPa, preferably in the range of 330 to 650 MPa and most preferably in the range of 350 to 600 MPa, and
b) a Charpy notched impact strength as defined by in-equation (III), more preferably by in-equation (IIIa), still more preferably by in-equation (IIIb), $$NIS > 60.0 - 23.0 \times \ln(MFR) \quad (III)$$

$$NIS > 63.0 - 23.0 \times \ln(MFR) \quad (IIIa)$$

$$NIS > 65.0 - 23.0 \times \ln(MFR) \quad (IIIb)$$

wherein
"NIS" is the Charpy notched impact strength according to ISO 179-1eA:2000 at 23° C. [in kJ/m$^2$] of the heterophasic propylene copolymer (RAHECO), and
"MFR" is the MFR$_2$ (230° C./2.16 kg) [in g/10 min] of the heterophasic propylene copolymer (RAHECO).

Preferably not only the heterophasic propylene copolymer (RAHECO) is featured by the specific values of toughness, flexural modulus and haze, but also the injection molded article comprising the heterophasic propylene copolymer (RAHECO) and thin wall packaging comprising the heterophasic propylene copolymer (RAHECO) when measured under the same conditions as indicated above. Accordingly the above indicated values of toughness, flexural modulus and haze are equally but proportionally applicable for the injection molded article and thin wall packaging.

The heterophasic propylene copolymer (RAHECO) according to this invention comprises a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term inclusion indicates that the matrix (M) and the inclusion form different phases within the heterophasic propylene copolymer (RAHECO). The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic propylene copolymer (RAHECO) according to this invention comprises as polymer components only the random propylene copolymer (R-PP) and the elastomeric propylene copolymer (E). In other words, the heterophasic propylene copolymer (RAHECO) may contain further additives but no other polymer in an amount exceeding 5.0 wt.-%, more preferably exceeding 3.0 wt.-%, like exceeding 1.0 wt.-%, based on the total heterophasic propylene copolymer (RAHECO). One additional polymer which may be present in such low amounts is a polyethylene which is a by-reaction product obtained by the preparation of the heterophasic propylene copolymer (RAHECO). Accordingly, it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

The heterophasic propylene copolymer (RAHECO) according to this invention can have a broad range of melt flow rate. Accordingly, the heterophasic propylene copolymer (HECO) has a melt flow rate MFR$_2$ (230° C.) in the range of 0.3 to 20.0 g/10 min, preferably in the range of 0.3 to 18.0 g/10 min, more preferably in the range of 0.4 to 16.0 g/10 min.

Preferably, it is desired that the heterophasic propylene copolymer (RAHECO) is thermo mechanically stable. Accordingly, it is appreciated that the heterophasic propylene copolymer (RAHECO) has a melting temperature of at least 130° C., more preferably in the range of 130 to 160° C., still more preferably in the range of 130 to 155° C.

Typically, the heterophasic propylene copolymer (RAHECO) has a rather low crystallization temperature, i.e. of not more than 110° C., more preferably in the range of 95 to 110° C., still more preferably in the range of 100 to 108° C. These values are especially applicable in case the heterophasic propylene copolymer (RAHECO) is not α-nucleated.

The heterophasic propylene copolymer (RAHECO) comprises apart from propylene also comonomers. Preferably the heterophasic propylene copolymer (RAHECO) comprises apart from propylene ethylene and/or C$_4$ to C$_8$ α-olefins. Accordingly the term "propylene copolymer" according to this invention is understood as a polypropylene comprising, preferably consisting of, units derivable from
(a) propylene
and
(b) ethylene and/or C$_4$ to C$_8$ α-olefins.

Thus, the heterophasic propylene copolymer (RAHECO), i.e. the random propylene copolymer (R-PP) such as the first propylene copolymer fraction (R-PP1) and the second propylene copolymer fraction (R-PP2), as well as the elastomeric propylene copolymer (E), comprises monomers copolymerizable with propylene, for example comonomers such as ethylene and/or C$_4$ to C$_8$ α-olefins, in particular ethylene and/or C$_4$ to C$_8$ α-olefins, e.g. 1-butene and/or 1-hexene. Preferably, the heterophasic propylene copolymer (RAHECO) according to this invention comprises, especially consists of, monomers copolymerizable with propylene from the group consisting of ethylene, 1-butene and 1-hexene. More specifically, the heterophasic propylene copolymer (RAHECO) of this invention comprises—apart from propylene—units derivable from ethylene and/or 1-butene. In a preferred embodiment, the heterophasic propylene copolymer (RAHECO) according to this invention comprises units derivable from ethylene and propylene only. Still more preferably the random propylene copolymer (R-PP), i.e. the first propylene copolymer fraction (R-PP1) and the second propylene copolymer fraction (R-PP2), as well as the elastomeric propylene copolymer (E) of the heterophasic propylene copolymer (RAHECO) contain the same comonomers, like ethylene.

Accordingly, the elastomeric propylene copolymer (E) is preferably an ethylene propylene rubber (EPR), whereas the random propylene copolymer (R-PP) is a random ethylene propylene copolymer (R-PP).

Additionally, it is appreciated that the heterophasic propylene copolymer (RAHECO) preferably has a moderate total comonomer content which contributes to the softness of the material. Thus, it is required that the comonomer content of the heterophasic propylene copolymer (RAHECO) is in the range from 11.5 to 21.0 mol-%, preferably in the range from 12.9 to 21.0 mol-%, more preferably in the range from 12.9 to 18.3 mol-%, yet more preferably in the range from 14.3 to 20.0 mol-%.

The xylene cold soluble (XCS) fraction measured according to according ISO 16152 (25° C.) of the heterophasic propylene copolymer (RAHECO) is in the range from 16.0 to 50.0 wt.-%, preferably in the range from 16.0 to 40.0 wt.-%, more preferably in the range from 16.0 to 35.0 wt.-%, still more preferably in the range from 17.0 to 28.0 wt.-%.

Further it is appreciated that the xylene cold soluble (XCS) fraction of the heterophasic propylene copolymer (RAHECO) is specified by its intrinsic viscosity. A low intrinsic viscosity (IV) value reflects a low weight average molecular weight. For the present invention it is appreciated that the xylene cold soluble fraction (XCS) of the heterophasic propylene copolymer (RAHECO) has an intrinsic viscosity (IV) measured according to ISO 1628/1 (at 135° C. in decalin) in the range of 2.0 to 4.5 dl/g, preferably in the range of 2.2 to 4.5 dl/g, more preferably in the range of 2.4 to below 4.5 dl/g, and most preferably in the range of 2.4 to below 4.3 dl/g.

Additionally it is preferred that the comonomer content, i.e. ethylene content, of the xylene cold soluble (XCS) fraction of the heterophasic propylene copolymer (RAHECO) is not more than 50.0 mol-%, more preferably in the range of 36.8 to 50.0 mol-%, still more preferably in the range of 36.8 to 47.9 mol-%, yet more preferably in the range of 38.0 to 45.8 mol-%. The comonomers present in the xylene cold soluble (XCS) fraction are those defined above for the random propylene copolymer (R-PP) and the elastomeric propylene copolymer (E), respectively. In one preferred embodiment the comonomer is ethylene only.

The heterophasic propylene copolymer (RAHECO) can be further defined by its individual components, i.e. the random propylene copolymer (R-PP) and the elastomeric propylene copolymer (E).

The random propylene copolymer (R-PP) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

As mentioned above the random propylene copolymer (R-PP) is featured by a moderate comonomer content. Accordingly, the comonomer content of the random propylene copolymer (R-PP) is in the range of 4.4 to 9.0 mol-%, yet more preferably in the range of 4.7 to 8.7 mol-%, still more preferably in the range of 5.0 to 8.7 mol-%.

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

The random propylene copolymer (R-PP) preferably comprises at least two polymer fractions, like two or three polymer fractions, all of them are propylene copolymers. Even more preferred the random propylene copolymer (R-PP) comprises, preferably consists of, a first propylene copolymer fraction (R-PP1) and a second propylene copolymer fraction (R-PP2). It is preferred that the first propylene copolymer fraction (R-PP1) is the comonomer lean fraction whereas the second propylene copolymer fraction (R-PP2) is the comonomer rich fraction.

Concerning the comonomers used for the first propylene copolymer fraction (R-PP1) and second propylene copolymer fraction (R-PP2) reference is made to the comonomers of the random propylene copolymer (R-PP). Preferably the first propylene copolymer fraction (R-PP1) and the second propylene copolymer fraction (R-PP2) contain the same comonomers, like ethylene.

It is preferred that the random propylene copolymer (R-PP) is featured by its relative content of isolated to block ethylene sequences (I(E)). According to the present invention the isolated to block ethylene sequences (I(E)) of the random propylene copolymer (R-PP) is measured on the xylene cold insoluble fraction (XCI) of the heterophasic propylene copolymer (RAHECO). Accordingly the xylene cold insoluble fraction (XCI) of the heterophasic propylene copolymer (RAHECO) has an isolated to block ethylene sequences (I(E)) in the range of 50.0 to 65.0%, like 53.0 to 65.0%, more preferably in the range of 54.0 to 63.0%, like 55.0 to 62.0%.

The I(E) content [%] is defined by in-equation (I)

$$I(E) = \frac{fPEP}{(fEEE + fPEE + fPEP)} \times 100 \quad (I)$$

wherein
I(E) is the relative content of isolated to block ethylene sequences [in %];
fPEP is the mol fraction of propylene/ethylene/propylene sequences (PEP) in the xylene cold insoluble fraction (XCI) of the heterophasic propylene copolymer (RAHECO);
fPEE is the mol fraction of propylene/ethylene/ethylene sequences (PEE) and of ethylene/ethylene/propylene sequences (EEP) in the xylene cold insoluble fraction (XCI) of the heterophasic propylene copolymer (RAHECO);
fEEE is the mol fraction of ethylene/ethylene/ethylene sequences (EEE) in the xylene cold insoluble fraction (XCI) of the heterophasic propylene copolymer (RAHECO), wherein all sequence concentrations being based on a statistical triad analysis of $^{13}$C-NMR data.

The random propylene copolymer (R-PP) according to this invention has a melt flow rate $MFR_2$ (230° C./2.16 kg) before visbreaking measured according to ISO 1133 in the range of 0.4 to 7.0 g/10 min, more preferably in the range of 0.5 to 6.5 g/10 min, still more preferably in the range of 0.6 to 6.0 g/10 min.

The heterophasic propylene copolymer (RAHECO) preferably comprises 60 to 90 wt.-%, like 60.0 to 87.0 wt.-%, more preferably 65.0 to 90.0 wt.-%, like 75.0 to 90.0 wt.-%, still more preferably 65.0 to 88.0 wt.-%, like 75 to 88.0 wt.-%, of the random propylene copolymer (R-PP), based on the total weight of the heterophasic propylene copolymer (RAHECO).

Additionally, the heterophasic propylene copolymer (RAHECO) preferably comprises, like consist of, 10 to 40 wt.-%, like 13.0 to 40.0 wt.-%, more preferably 10.0 to 35.0 wt.-%, like 10.0 to 25.0 wt.-%, still more preferably 12.0 to 35.0 wt.-%, like 12.0 to 25.0 wt.-%, of the elastomeric propylene copolymer (E), based on the total weight of the heterophasic propylene copolymer (RAHECO).

Thus, it is appreciated that the heterophasic propylene copolymer (RAHECO) preferably comprises, more preferably consists of, 65.0 to 88.0 wt.-% of the random propylene copolymer (R-PP) and 12.0 to 35.0 wt.-% of the elastomeric propylene copolymer (E), based on the total weight of the heterophasic propylene copolymer (RAHECO).

Accordingly, a further component of the heterophasic propylene copolymer (RAHECO) is the elastomeric propylene copolymer (E) dispersed in the matrix (M). Concerning the comonomers used in the elastomeric propylene copolymer (E) it is referred to the information provided for the heterophasic propylene copolymer (RAHECO). Accordingly the elastomeric propylene copolymer (E) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the elastomeric propylene copolymer (E) comprises, especially consists of, monomers copolymerizable with propylene from the group consisting of ethylene, 1-butene and 1-hexene. More specifically, the elastomeric propylene copolymer (E) comprises—apart from propylene—units derivable from ethylene and/or 1-butene. Thus, in an especially preferred embodiment the elastomeric propylene copolymer (E) comprises units derivable from ethylene and propylene only.

The comonomer content, like ethylene content, of the elastomeric propylene copolymer (E) preferably is in the range of 50.0 to 80.0 mol-%, more preferably in the range of 53.0 to 78.0 mol-%, still more preferably in the range of 55.0 to 76.0 mol.

As mentioned above multiphase structures can be identified by the presence of at least two distinct glass transition temperatures. The higher glass transition temperature $Tg(1)$ represents the matrix whereas the lower glass transition temperature $Tg(2)$ reflects the elastomeric propylene copolymer (E) of the heterophasic propylene copolymer (RAHECO).

Accordingly, it is one preferred requirement of the present invention, that the heterophasic propylene copolymer (RAHECO) has a glass transition temperature $Tg(2)$ fulfilling the in-equation (IV), more preferably the in-equation (IVa), still more preferably in-equation (IVb), $$Tg(2)>20.0-2.0\times C(XCS) \quad (IV)$$

$$Tg(2)>19.0-2.0\times C(XCS) \quad (IVa)$$

$$Tg(2)>18.0-2.0\times C(XCS) \quad (IVb)$$

wherein
$Tg(2)$ is the glass transition temperature of the heterophasic propylene copolymer (RAHECO);
$C(XCS)$ is the comonomer content [in mol-%] of the xylene cold soluble content (XCS) of the heterophasic propylene copolymer (RAHECO).

Preferrably said glass transition temperature $Tg(2)$ is below −35° C., more preferably is in the range of −62 to −45° C., still more preferably in the range of −60 to −50° C. It is especially preferred that the heterophasic propylene copolymer (RAHECO) has a glass transition temperature $Tg(2)$ as mentioned in this paragraph and fulfilling the in-equation (IV) as defined in the present invention.

It is further appreciated that the the heterophasic propylene copolymer (RAHECO) according to this invention has additionally a first glass transition temperature $Tg(1)$ (representing the matrix (M) of the heterophasic propylene copolymer (RAHECO)) in the range of −12 to +2° C., more preferably in the range of −10 to +2° C.

Accordingly the the first glass transition temperature $Tg(1)$ is preferably above the second glass transition temperature $Tg(2)$. Still more preferably the difference between the first glass transition temperature $Tg(1)$ and second glass transition temperature $Tg(2)$ is at least 40° C., more preferably at least 45° C., yet more preferably in the range of 40 to 55° C., still more preferably in the range of 45 to 52° C.

The heterophasic propylene copolymer (RAHECO) as defined in the instant invention may contain up to 5.0 wt.-% additives, like nucleating agents and antioxidants, as well as slip agents and antiblocking agents. Preferably the additive content (without α-nucleating agents) is below 3.0 wt.-%, like below 1.0 wt.-%.

In one embodiment of the present invention, the heterophasic propylene copolymer (RAHECO) comprises a nucleating agent, more preferably a α-nucleating agent. Even more preferred the present invention is free of β-nucleating agents. The α-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer, and
(v) mixtures thereof.

Such additives are generally commercially available and are described, for example, in "Plastic Additives Handbook", 5th edition, 2001 of Hans Zweifel.

Preferably the heterophasic propylene copolymer (RAHECO) contains up to 2.0 wt.-% of the α-nucleating agent. In a preferred embodiment, the heterophasic propylene copolymer (RAHECO) contains not more than 3000 ppm, more preferably of 1 to 3000 ppm, more preferably of 5 to 2000 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

The heterophasic propylene copolymer (RAHECO) according to this invention is preferably produced in the presence of
(a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester and still more preferably is a diester of non-phthalic dicarboxylic acids;
(b) optionally a co-catalyst (Co), and
(c) optionally an external donor (ED).

It is preferred that the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate. Additionally or alternatively, the molar-ratio of co-catalyst (Co) to external donor (ED) [Co/ED] is 5 to 45.

It is thus one requirement of the present invention that the heterophasic propylene copolymer (RAHECO) is free of phthalic acid esters as well as their respective decomposition products, i.e. phthalic acid esters, typically used as internal donor of Ziegler-Natta (ZN) catalysts. Preferably, the heterophasic propylene copolymer (RAHECO) is free of phthalic compounds as well as their respective decomposition products, i.e. phthalic compounds typically used as internal donor of Ziegler-Natta (ZN) catalysts.

The term "free of" phthalic acid esters, preferably phthalic compounds, in the meaning of the present invention refers to a heterophasic propylene copolymer (RAHECO) in which no phthalic acid esters as well no respective decomposition products, preferably no phthalic compounds as well as no respective decomposition products at all, are detectable.

As the heterophasic propylene copolymer (RAHECO) comprises the random propylene copolymer (R-PP) and the elastomeric propylene copolymer (E), the individual components are preferably also free of phthalic acid esters as well as their respective decomposition products, more preferably of phthalic compounds as well as their respective decomposition products.

The heterophasic propylene copolymer (RAHECO) comprises a matrix (M) being a random propylene copolymer (R-PP) and an elastomeric propylene copolymer (E) dispersed in said matrix (M). Preferably the random propylene copolymer (R-PP) comprises at least two polymer fractions, like two or three polymer fractions, all of them are propylene copolymers. Even more preferred the random propylene copolymer (R-PP) comprises, preferably consists of, a first propylene copolymer fraction (R-PP1) and a second propylene copolymer fraction (R-PP2).

Further it is preferred that the first propylene copolymer fraction (R-PP1) and the second propylene copolymer fraction (R-PP2) have nearby the same melt flow rate. Accordingly it is preferred that difference between the melt flow rate of the random propylene copolymer (R-PP) and the first propylene copolymer fraction (R-PP1) [MFR(Pre-R-PP)–MFR(Pre-R-PP1)] is below +/−1.5 g/10 min, more preferably +/−1.0 g/10 min, yet more preferably +/−0.5 g/10 min. Thus, in one embodiment the first propylene copolymer fraction (R-PP1) and the second propylene copolymer fraction (R-PP2) have a melt flow rate $MFR_2$ (230° C.) in the range of 0.4 to 7.0 g/10 min In one embodiment of the present invention, the heterophasic propylene copolymer (RAHECO) has been visbroken.

The visbroken heterophasic propylene copolymer (RAHECO) preferably has a higher melt flow rate than the non-visbroken heterophasic propylene copolymer (RAHECO).

Accordingly, the heterophasic propylene copolymer (RAHECO) before visbreaking preferably has a melt flow rate $MFR_2$ (230° C.) in the range of 0.3 to 5.0 g/10 min. For example, the melt flow rate (230° C./2.16 kg) of the heterophasic propylene copolymer (RAHECO) before visbreaking is from 0.3 to 4.0 g/10 min, like from 0.3 to 3.0 g/10 min.

Furthermore, the melt flow rate (230° C./2.16 kg) of the heterophasic propylene copolymer (RAHECO) after visbreaking is higher, i.e. from 0.5 to 20.0 g/10 min. For example, the melt flow rate (230° C./2.16 kg) of the heterophasic propylene copolymer (RAHECO) after visbreaking is from 0.7 to 18.0 g/10 min, like from 1.0 to 15.0 g/10 min.

In one embodiment of the present invention, the heterophasic propylene copolymer (RAHECO) has been visbroken with a visbreaking ratio (VR) as defined by equation (I)

$$1.5 \leq \frac{MFRfinal - MFRinitial}{MFRinitial} \leq 30.0 \quad (II)$$

wherein
"MFRfinal" is the $MFR_2$ (230° C./2.16 kg) of the heterophasic propylene copolymer (RAHECO) after visbreaking
and
"MFRinitial" is the $MFR_2$ (230° C./2.16 kg) of the heterophasic propylene copolymer (RAHECO) before visbreaking Preferred mixing devices suited for visbreaking are discontinuous and continuous kneaders, twin screw extruders and single screw extruders with special mixing sections and co-kneaders.

By visbreaking the heterophasic propylene copolymer (RAHECO) with heat or at more controlled conditions with peroxides, the molar mass distribution (MWD) becomes narrower because the long molecular chains are more easily broken up or scissored and the molar mass M, will decrease, corresponding to an $MFR_2$ increase. The $MFR_2$ increases with increase in the amount of peroxide which is used.

Such visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert-.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of heterophasic propylene copolymer (RAHECO) to be subjected to visbreaking, the $MFR_2$ (230° C./2.16 kg) value of the heterophasic propylene copolymer (RAHECO) to be subjected to visbreaking and the desired target $MFR_2$ (230° C./2.16 kg) of the product to be obtained. Accordingly, typical amounts of peroxide visbreaking agent are from 0.005 to 0.7 wt.-%, more preferably from 0.01 to 0.4 wt.-%, based on the total amount of heterophasic propylene copolymer (RAHECO) employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The inventive heterophasic propylene copolymer (RAHECO) is preferably obtained by visbreaking the heterophasic propylene copolymer (RAHECO), preferably visbreaking by the use of peroxide.

More precisely, the inventive heterophasic propylene copolymer (RAHECO) may be obtained by visbreaking the heterophasic propylene copolymer (RAHECO), preferably by the use of peroxide as mentioned above, in an extruder.

After visbreaking the heterophasic propylene copolymer (RAHECO) according to this invention is preferably in the form of pellets or granules. The instant heterophasic propylene copolymer (RAHECO) is preferably used in pellet or granule form for the preparation of the injection molded article.

The present invention is not only directed to the instant heterophasic propylene copolymer (RAHECO) but also to injection molded articles made therefrom. The injection molded articles preferably comprise at least 70 wt.-%, more preferably at least 90 wt.-%, yet more preferably at least 95 wt.-%, still more preferably consist of, a heterophasic propylene copolymer (RAHECO) as defined herein.

Further present invention is also directed to thin wall packaging elements, like thin wall packaging elements produced by injection molding, comprising at least 70 wt.-%, more preferably at least 90 wt.-%, yet more preferably at least 95 wt.-%, still more preferably consisting of, a heterophasic propylene copolymer (RAHECO) as defined herein.

The thin wall packaging elements, like thin wall packaging elements produced by injection molding, preferably have a thickness of equal or below 2 mm, preferably in the range of 0.2 to 2.0 mm. Said thin wall packaging elements are preferably produced by injection molding. Further the thin wall packaging elements are preferably selected from the group consisting of cups, boxes, trays, pails, buckets, bowls, lids, flaps, caps, CD covers, DVD covers and the like.

The present invention is also directed to the use of the heterophasic propylene copolymer (RAHECO) in the manufacture of injected molded articles.

Further, the present invention is directed to the use of the heterophasic propylene copolymer as defined herein for improving the toughness of an injection molded article. In particular, the improvement is accomplished when the article has a Charpy notched impact strength as defined by in-equation (III); more preferably by in-equation (IIIa), still more preferably by in-equation (IIIb), $$NIS > 60.0 - 23.0 \times \ln(MFR) \tag{III}$$

$$NIS > 63.0 - 23.0 \times \ln(MFR) \tag{IIIa}$$

$$NIS > 65.0 - 23.0 \times \ln(MFR) \tag{IIIb}$$

wherein
"NIS" is the Charpy notched impact strength according to ISO 179-1eA:2000 at 23° C. [in kJ/m$^2$] of the heterophasic propylene copolymer (RAHECO), and
"MFR" is the MFR$_2$ (230° C./2.16 kg) [in g/10 min] of the heterophasic propylene copolymer (RAHECO).

For example, the improvement is accomplished when the instant heterophasic propylene copolymer (RAHECO) features a Charpy notched impact strength according to ISO 179-1eA:2000 at 23° C. in the range of 5.0 to 90.0 kJ/m$^2$, preferably in the range of 10.0 to 90.0 kJ/m$^2$.

Additionally or alternatively, the improvement is accomplished when the heterophasic propylene copolymer (RAHECO) has a flexural modulus measured according to ISO 178 in the range of 300 to 700 MPa. For example, the heterophasic propylene copolymer (RAHECO) has a flexural modulus measured according to ISO 178 in the range of 330 to 650 MPa or in the range of 350 to 600 MPa.

Thus, in one embodiment the improvement is accomplished when the heterophasic propylene copolymer (RAHECO) has
a) a flexural modulus measured according to ISO 178 in the range of 300 to 700 MPa, preferably in the range of 330 to 650 MPa and most preferably in the range of 350 to 600 MPa,
and
b) a Charpy notched impact strength as defined by in-equation (III); more preferably by in-equation (IIIa), still more preferably by in-equation (IIIb), $$NIS > 60.0 - 23.0 \times \ln(MFR) \tag{III}$$

$$NIS > 63.0 - 23.0 \times \ln(MFR) \tag{IIIa}$$

$$NIS > 65.0 - 23.0 \times \ln(MFR) \tag{IIIb}$$

wherein
"NIS" is the Charpy notched impact strength according to ISO 179-1eA:2000 at 23° C. [in kJ/m$^2$] of the heterophasic propylene copolymer (RAHECO), and
"MFR" is the MFR$_2$ (230° C./2.16 kg) [in g/10 min] of the heterophasic propylene copolymer (RAHECO),
and
c) a haze according to ASTM D 1003-00 measured on a 1 mm thick injection molded specimen in the range of 78.0 to 100.0% and most preferably in the range of 80.0 to 100.0%.

The instant heterophasic propylene copolymer (RAHECO) is preferably produced in a multistage process comprising at least two reactors connected in series a heterophasic propylene copolymer (RAHECO) comprising a matrix (M) being a random propylene copolymer (PP) and an elastomeric propylene copolymer (E) dispersed in said matrix (M), Further, the weight ratio between the first propylene copolymer fraction (R-PP1) and second propylene copolymer fraction (R-PP2) preferably is 20:80 to 80:20, more preferably 25:75 to 75:25, still more preferably 30:70 to 70:30.

Preferably the heterophasic propylene copolymer (RAHECO) is obtained by a sequential polymerization process comprising the steps of
(a) polymerizing in a first reactor propylene and ethylene and/or C$_4$ to C$_8$ α-olefin obtaining thereby a first propylene copolymer fraction (R-PP1),
(b) transferring said first propylene copolymer fraction (R-PP1) in a second reactor,
(c) polymerizing in said second reactor in the presence of the first propylene copolymer fraction (R-PP1) propylene and ethylene and/or C$_4$ to C$_8$ α-olefin obtaining a second propylene copolymer fraction (R-PP2), said first propylene copolymer fraction (R-PP1) and said second propylene copolymer fraction (R-PP2) form the matrix (PP),
(d) transferring said matrix (M) in a third reactor,
(e) polymerizing in said third reactor in the presence of the matrix (M) propylene and ethylene and/or C$_4$ to C$_8$ α-olefin obtaining an elastomeric propylene copolymer (E), said matrix (M) and said elastomeric propylene copolymer (E) form the heterophasic propylene copolymer (RAHECO).

For preferred embodiments of the heterophasic propylene copolymer (HECO), the random propylene copolymer (R-PP), the first propylene copolymer fraction (R-PP1), the second propylene copolymer fraction (R-PP2), and the elastomeric copolymer (E) reference is made to the definitions given above.

The term "sequential polymerization process" indicates that the heterophasic propylene copolymer (HECO) is produced in at least two, like three, reactors connected in series. Accordingly the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor (R3) are gas phase reactors (GPR). Accordingly for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (RAHECO) as defined above the conditions for the first reactor, i.e. the slurry reactor, like a loop reactor, may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture of the first reactor is transferred to the second reactor, i.e. gas phase reactor, where the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor is similar to the second reactor.

The residence time can vary in the three reactor zones.

In one embodiment of the process for producing the heterophasic propylene copolymer (RAHECO) the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor, i.e. in the slurry reactor, like in the loop reactor, and/or as a condensed mode in the gas phase reactors.

Preferably, the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (RAHECO) is obtained by a multistage polymerization process, as described above, in the presence of a catalyst system.

As pointed out above in the specific process for the preparation of the heterophasic propylene copolymer (RAHECO) as defined above, a specific Ziegler-Natta catalyst (ZN-C) must be used. Accordingly, the Ziegler-Natta catalyst (ZN-C) will be now described in more detail.

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is selfsupported.

The Ziegler-Natta catalyst (ZN-C) can be further defined by the way as obtained. Accordingly, the Ziegler-Natta catalyst (ZN-C) is preferably obtained by a process comprising the steps of a)

$a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;
or a$_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;
or a$_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of a$_2$) or a$_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R'' $(OH)_m$ to obtain said magnesium alkoxide compounds. Preferred polyhydric alcohols, if used, are alcohols, wherein R'' is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with a aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m², more preferably below 10 g/m². Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 261027 and EP2610272 which are incorporated here by reference.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

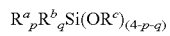

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor), the latter especially preferred.

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminum, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as AlH$_3$, of less than 1.0 wt % with respect to the triethyl aluminium (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 450, still more preferably is in the range of 120 to 350.

In the following the present invention is further illustrated by means of examples.

EXAMPLES

1. Measuring Methods

The following definitions of terms and determination methods apply for the above general description of the invention as well as to the below examples unless otherwise defined. Calculation of comonomer content of the second propylene copolymer fraction (R-PP2):

$$\frac{C(PP) - w(PP1) \times C(PP1)}{w(PP2)} = C(PP2) \quad (I)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
C(PP1) is the comonomer content [in mol-%] of the first propylene copolymer fraction (R-PP1),
C(PP) is the comonomer content [in mol-%] of the random propylene copolymer (R-PP),
C(PP2) is the calculated comonomer content [in mol-%] of the second propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \quad \text{(II)}$$

wherein w(PP1) is the weight fraction [in wt.-%] of the first propylene copolymer fraction (R-PP1), w(PP2) is the weight fraction [in wt.-%] of second propylene copolymer fraction (R-PP2), XS(PP1) is the xylene cold soluble (XCS) content [in wt.-%] of the first propylene copolymer fraction (R-PP1), XS(PP) is the xylene cold soluble (XCS) content [in wt.-%] of the random propylene copolymer (R-PP), XS(PP2) is the calculated xylene cold soluble (XCS) content [in wt.-%] of the second propylene copolymer fraction (R-PP2), respectively.

Calculation of melt flow rate $MFR_2$ (230° C.) of the second propylene copolymer fraction (R-PP2):

$$MFR(PP2) = 10^{\left[\frac{\log(MFR(PP)) - w(PP1) \times \log(MFR(PP1))}{w(PP2)}\right]} \quad \text{(III)}$$

wherein w(PP1) is the weight fraction [in wt.-%] of the first propylene copolymer fraction (R-PP1), w(PP2) is the weight fraction [in wt.-%] of second propylene copolymer fraction (R-PP2), MFR(PP1) is the melt flow rate $MFR_2$ (230° C.) [in g/10 min] of the first propylene copolymer fraction (R-PP1), MFR(PP) is the melt flow rate $MFR_2$ (230° C.) [in g/10 min] of the random propylene copolymer (R-PP), MFR(PP2) is the calculated melt flow rate $MFR_2$ (230° C.) [in g/10 min] of the second propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad \text{(IV)}$$

wherein w(PP) is the weight fraction [in wt.-%] of the random propylene copolymer (R-PP), i.e. polymer produced in the first and second reactor (R1+R2), w(E) is the weight fraction [in wt.-%] of the elastomeric propylene copolymer (E), i.e. polymer produced in the third and fourth reactor (R3+R4)

C(PP) is the comonomer content [in mol-%] of the random propylene copolymer (R-PP), i.e. comonomer content [in wt.-%] of the polymer produced in the first and second reactor (R1+R2), C(RAHECO) is the comonomer content [in mol-%] of the propylene copolymer, i.e. is the comonomer content [in mol-%] of the polymer obtained after polymerization in the fourth reactor (R4), C(E) is the calculated comonomer content [in mol-%] of elastomeric propylene copolymer (E), i.e. of the polymer produced in the third and fourth reactor (R3+R4).

$MFR_2$ (230° C.) is measured according to ISO 1133 (230° C., 2.16 kg load).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C$ $\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate $(Cr(acac)_3)$ resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C$ $\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ $\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$E[mol\ \%] = 100 * fE$

The weight percent comonomer incorporation was calculated from the mole fraction:

$E[wt\ \%] = 100 * (fE * 28.06) / ((fE * 28.06) + ((1-fE) * 42.08))$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation was calculated from the triad sequence distribution using the following relationship (equation (I)):

$$I(E) = \frac{fPEP}{(fEEE + fPEE + fPEP)} \times 100 \quad (I)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005-07-01. The part which remains insoluble is the xylene cold insoluble (XCI) fraction.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 11357-3:1999 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step.

The glass transition temperature Tg is determined by dynamic mechanical analysis according to ISO 6721-7. The measurements are done in torsion mode on compression moulded samples (40×10×1 $mm^3$) between −100° C. and +150° C. with a heating rate of 2° C./min and a frequency of 1 Hz.

Transparency, haze and clarity were determined according to ASTM D1003-00 on 60×60×1 $mm^3$ plaques injection molded in line with EN ISO 1873-2 using a melt temperature of 200° C.

Flexural Modulus: The flexural modulus was determined in 3-point-bending according to ISO 178 on 80×10×4 $mm^3$ test bars injection molded at 23° C. in line with EN ISO 1873-2.

Charpy notched impact strength is determined according to ISO 179 1eA at 23°, and at −20° C. by using an 80×10×4 $mm^3$ test bars injection molded in line with EN ISO 1873-2.

2. Examples

The catalyst used in the polymerization processes for the heterophasic propylene copolymers (RAHECO) of the inventive examples (IE) was prepared as follows:
Used Chemicals:
20% solution in toluene of butyl ethyl magnesium (Mg(Bu)(Et), BEM), provided by Chemtura
2-ethylhexanol, provided by Amphochem
3-Butoxy-2-propanol—(DOWANOL™ PnB), provided by Dow
bis(2-ethylhexyl)citraconate, provided by SynphaBase
$TiCl_4$, provided by Millenium Chemicals
Toluene, provided by Aspokem
Viscoplex® 1-254, provided by Evonik
Heptane, provided by Chevron
Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).
Preparation of Solid Catalyst Component 20.3 kg of $TiCl_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min) During the first heptane wash the temperature was decreased to 50° C. and during the second wash to room temperature.

The thus obtained catalyst was used along with triethylaluminium (TEAL) as co-catalyst and dicyclopentyl dimethoxy silane (D-Donor) as donor.

The aluminium to donor ratio, the aluminium to titanium ratio and the polymerization conditions are indicated in table 1.

Comparative example 1 is the commercial grade Borsoft SA233CF produced by Borealis being an ethylene-propylene random-heterophasic copolymer. Comparative example 2 is the commercial grade Borsoft SC820CF produced by Borealis being an ethylene-propylene random-heterophasic copolymer.

TABLE 1

Polymerization conditions

|  |  | IE 1 | IE 4 | IE 7 |
|---|---|---|---|---|
| Prepolymerization |  |  |  |  |
| TEAL/Ti | [mol/mol] | 280 | 280 | 220 |
| TEAL/donor | [mol/mol] | 7.5 | 7.5 | 6.1 |
| Temperature | [° C.] | 30 | 30 | 20 |
| C2 feed | [kg/h] | 0.33 | 0.33 | 0.33 |
| res. time | [h] | 0.36 | 0.36 | 0.37 |
| Loop |  |  |  |  |
| Temperature | [° C.] | 70 | 70 | 70 |
| Split | [%] | 37 | 36 | 17 |
| H2/C3 ratio | [mol/kmol] | 0.23 | 0.23 | 0.7 |
| C2/C3 ratio | [mol/kmol] | 4.31 | 4.1 | 5.3 |
| MFR$_2$ | [g/10 min] | 0.68 | 0.61 | 4.4 |
| XCS | [wt.-%] | 6.2 | 6.0 | 6.3 |
| C2 content | [mol-%] | 3.6 | 3.4 | 4.0 |
| GPR 1 |  |  |  |  |
| Temperature | [° C.] | 80 | 80 | 80 |
| Pressure | [kPa] | 2200 | 2200 | 2000 |
| Split | [%] | 47 | 47 | 63 |
| H2/C3 ratio | [mol/kmol] | 36 | 120 | 151 |
| C2/C3 ratio | [mol/kmol] | 576 | 573 | 494 |
| MFR$_2$ | [g/10 min] | 0.65 | 0.72 | 4.6 |
| XCS | [wt.-%] | 7.3 | 9.3 | 9.0 |
| C2 content | [mol-%] | 6.6 | 8.6 | 6.9 |
| GPR 2 |  |  |  |  |
| Temperature | [° C.] | 70 | 70 | 75 |
| Pressure | [kPa] | 1600 | 1600 | 2500 |
| Split | [%] | 16 | 17 | 20 |
| C2/C3 ratio | [mol/kmol] | 36 | 120 | 151 |
| H2/C2 ratio | [mol/kmol] | 576 | 573 | 494 |
| MFR$_2$ | [g/10 min] | 0.54 | 0.66 | 2.8 |
| XCS | [wt.-%] | 22.0 | 22.4 | 27.1 |
| C2 content | [mol-%] | 17.3 | 16.0 | 17.7 |

C2 ethylene
H$_2$/C3 ratio hydrogen/propylene ratio
C2/C3 ratio ethylene/propylene ratio
1/2/3 GPR 1/2/3 gas phase reactor
Loop Loop reactor

TABLE 2

Properties

|  |  | IE1 | IE2 | IE3 | IE4 | IE5 | IE6 | IE8 | CE1 | CE2 |
|---|---|---|---|---|---|---|---|---|---|---|
| MFR$_2$ | [g/10 min] | 0.54 | 3.94 | 12.7 | 0.66 | 3.75 | 12.9 | 12.36 | 0.5 | 4.6 |
| VR | [—] | 0 | 6 | 23 | 0 | 5 | 19 | 3 | 0 | 0 |
| C2 (total) | [mol-%] | 17.3 | 17.3 | 17.3 | 16.0 | 16.0 | 16.0 | 17.7 | 14.6 | 12.0 |
| XCS | [wt.-%] | 22.0 | 21.5 | 21.2 | 22.4 | 22.0 | 21.8 | 26.6 | 21.8 | 19.4 |
| C2 (XCS) | [mol-%] | 45.7 | 45.5 | 45.4 | 39.1 | 38.5 | 38.2 | 42.1 | 40.6 | 39.1 |
| iV (XCS) | [dl/g] | 4.1 | 3.8 | 3.1 | 3.0 | 2.8 | 2.0 | 2.6 | 2.7 | 1.6 |
| Tc | [° C.] | 106 | 106 | 106 | 105.6 | 105.6 | 105.6 | 102.9 | 95.8 | 103.2 |
| Tm | [° C.] | 144.8 | 144.8 | 144.8 | 144.1 | 144.1 | 144.1 | 142.5 | 139.5 | 141.3 |
| Tg (2) | [° C.] | −55.0 | −55.4 | −55.0 | −54.7 | −54.8 | −54.5 | −54.7 | −54.0 | −54.1 |
| Tg (1) | [° C.] | −4.3 | −5.1 | −4.8 | −6.1 | −6.4 | −7.1 | −3.7 | −4.0 | −4.1 |
| NIS @ 23° C. | [kJ/m$^2$] | 86.9 | 35.5 | 16.9 | 82.4 | 42.5 | 20.6 | 13.78 | 72 | 11.4 |
| NIS @ −20° C. | [kJ/m$^2$] | 6.0 | 5.3 | 4.7 | 3.2 | 3.6 | 3.6 | 3.83 | 2 | 1.1 |
| FM | [Mpa] | 545 | 524 | 511 | 458 | 452 | 447 | 495 | 514 | 576 |
| Haze | [%] | 100 | 97 | 97 | 93 | 85 | 86 | 93 | 75 | 60 |

VR visbreaking ratio
C2 ethylene
Tg(1) glass transition temperature of the matrix (M)
Tg(2) glass transition temperature of the elastomeric propylene copolymer (E)
FM Flexural modulus

TABLE 3

Relative content of isolated to block ethylene sequences (I(E)) of the XCI fraction

|  |  | IE 1 | IE 4 | IE 7 | CE 1 |
|---|---|---|---|---|---|
| I(E)[1] | [%] | 56.9 | 57.6 | 57.6 | 66.7 |
| fEEE | [mol.-%] | 1.67 | 1.53 | 1.63 | 1.05 |
| fEEP | [mol.-%] | 1.22 | 1.07 | 0.98 | 0.85 |
| fPEP | [mol.-%] | 3.81 | 3.53 | 3.54 | 3.8 |

[1] $I(E) = \dfrac{fPEP}{(fEEE + fPEE + fPEP)} \times 100$

The inventive heterophasic propylene copolymers (RA-HECO) IE2 and IE3 (based on IE1), IE5 and IE6 (based on IE4), and IE7 (based on the 3$^{rd}$ reactor product from Table 1) have been visbroken by using a co-rotating twin-screw extruder at 200-230° C. and using an appropriate amount of (tert.-butylperoxy)-2,5-dimethylhexane (Trigonox 101, distributed by Akzo Nobel, Netherlands) to achieve the target MFR$_2$ as mentioned in table 1. All products were stabilized with 0.2 wt.-% of Irganox B225 (1:1-blend of Irganox 1010 (Pentaerythrityl-tetrakis(3-(3',5'-di-tert.butyl-4-hydroxy-toluyl)-propionate and tris (2,4-di-t-butylphenyl) phosphate) phosphite) of BASF AG, Germany) and 0.1 wt.-% calcium stearate.

As can be gathered from Table 1, the inventive examples show an optimized or improved balance between stiffness and toughness. Further, the FIGURE shows that the inventive examples show an improved toughness as function of processability.

The invention claimed is:

1. A heterophasic propylene copolymer (RAHECO), said heterophasic propylene copolymer (RAHECO) comprises a matrix (M) being a random propylene copolymer (R-PP) and an elastomeric propylene copolymer (E) dispersed in said matrix (M), wherein the heterophasic propylene copolymer (RA-HECO) has a) a melt flow rate MFR$_2$ (230° C.) measured according to ISO 1133 in the range of 0.3 to 20.0 g/10 min,
b) a xylene cold soluble content (XCS) determined according ISO 16152 (25° C.) in the range of 16.0 to 50.0 wt.-%,
c) a comonomer content in the range of 11.5 to 21.0 mol-%, and wherein further the heterophasic propylene copolymer (RAHECO) has a Charpy notched impact strength as defined by in-equation (III)

$$NIS > 60 - 23.0 \times \ln(MFR) \tag{III}$$

wherein
"NIS" is the Charpy notched impact strength according to ISO 179-1eA:2000 at 23° C. [in kJ/m$^2$] of the heterophasic propylene copolymer (RAHECO), and
"MFR" is the MFR$_2$ (230° C./2.16 kg) [in g/10 min] of the heterophasic propylene copolymer (RAHECO),
wherein further
d) the xylene cold insoluble fraction (XCI) of the heterophasic propylene copolymer (RAHECO) has a relative content of isolated to block ethylene sequences (I(E)) in the range of 50.0 to 65.0%, wherein the I(E) content is defined by equation (I)

$$I(E) = \frac{fPEP}{(fEEE + fPEE + fPEP)} \times 100 \tag{I}$$

wherein
I(E) is the relative content of isolated to block ethylene sequences [in %];
fPEP is the mol fraction of propylene/ethylene/propylene sequences (PEP) in the xylene cold insoluble fraction (XCI) of the heterophasic propylene copolymer (RAHECO);
fPEE is the mol fraction of propylene/ethylene/ethylene sequences (PEE) and of ethylene/ethylene/propylene sequences (EEP) in the xylene cold insoluble fraction (XCI) of the heterophasic propylene copolymer (RAHECO);
fEEE is the mol fraction of ethylene/ethylene/ethylene sequences (EEE) in the xylene cold insoluble fraction (XCI) of the heterophasic propylene copolymer (RAHECO),
wherein all sequence concentrations being based on a statistical triad analysis of $^{13}$C-NMR data.

2. The heterophasic propylene copolymer (RAHECO) according to claim 1, wherein the heterophasic propylene copolymer (RAHECO) is free of phthalic acid esters as well as their respective decomposition products.

3. A heterophasic propylene copolymer (RAHECO), said heterophasic propylene copolymer (RAHECO) comprises a matrix (M) being a random propylene copolymer (R-PP) and an elastomeric propylene copolymer (E) dispersed in said matrix (M),
wherein the heterophasic propylene copolymer (RAHECO) has
a) a melt flow rate MFR$_2$ (230° C.) measured according to ISO 1133 in the range of 0.3 to 20.0 g/10 min,
b) a xylene cold soluble content (XCS) determined according ISO 16152 (25° C.) in the range of 16.0 to 50.0 wt.-%, and
c) a comonomer content in the range of 11.5 to 21.0 mol-%, and wherein further the heterophasic propylene copolymer (RAHECO) has a Charpy notched impact strength as defined by in-equation (III)

$$NIS > 60 - 23.0 \times \ln(MFR) \tag{III}$$

wherein
"NIS" is the Charpy notched impact strength according to ISO 179-1eA:2000 at 23° C. [in kJ/m$^2$] of the heterophasic propylene copolymer (RAHECO), and
"MFR" is the MFR$_2$ (230° C./2.16 kg) [in g/10 min] of the heterophasic propylene copolymer (RAHECO).

4. The heterophasic propylene copolymer (RAHECO) according to claim 3, wherein
a) the xylene cold insoluble fraction (XCI) of the heterophasic propylene copolymer (RAHECO) has a relative content of isolated to block ethylene sequences (I(E)) in the range of 50.0 to 65.0%, wherein the I(E) content is defined by equation (I)

$$I(E) = \frac{fPEP}{(fEEE + fPEE + fPEP)} \times 100 \tag{I}$$

wherein
I(E) is the relative content of isolated to block ethylene sequences [in %];
fPEP is the mol fraction of propylene/ethylene/propylene sequences (PEP) in the xylene cold insoluble fraction (XCI) of the heterophasic propylene copolymer (RAHECO);
fPEE is the mol fraction of propylene/ethylene/ethylene sequences (PEE) and of ethylene/ethylene/propylene sequences (EEP) in the xylene cold insoluble fraction (XCI) of the heterophasic propylene copolymer (RAHECO);
fEEE is the mol fraction of ethylene/ethylene/ethylene sequences (EEE) in the xylene cold insoluble fraction (XCI) of the heterophasic propylene copolymer (RAHECO),
wherein all sequence concentrations being based on a statistical triad analysis of $^{13}$C-NMR data
and/or
b) wherein the heterophasic propylene copolymer (RAHECO) is free of phthalic acid esters as well as their respective decomposition products.

5. A heterophasic propylene copolymer (RAHECO), said heterophasic propylene copolymer (RAHECO) comprises a matrix (M) being a random propylene copolymer (R-PP) and an elastomeric propylene copolymer (E) dispersed in said matrix (M),
wherein the heterophasic propylene copolymer (RAHECO) has
a) a melt flow rate MFR$_2$ (230° C.) measured according to ISO 1133 in the range of 0.3 to 20.0 g/10 min,
b) a xylene cold soluble content (XCS) determined according ISO 16152 (25° C.) in the range of 16.0 to 50.0 wt.-%, and
c) a comonomer content in the range of 11.5 to 21.0 mol-%,
wherein further the heterophasic propylene copolymer (RAHECO) is free of phthalic acid esters as well as their respective decomposition products.

6. Heterophasic propylene copolymer (RAHECO) according to claim 5, wherein the xylene cold insoluble fraction (XCI) of the heterophasic propylene copolymer (RAHECO) has a relative content of isolated to block ethylene sequences (I(E)) in the range of 50.0 to 65.0%, wherein the I(E) content is defined by equation (I)

$$I(E) = \frac{fPEP}{(fEEE + fPEE + fPEP)} \times 100 \quad (I)$$

wherein
I(E) is the relative content of isolated to block ethylene sequences [in %];
fPEP is the mol fraction of propylene/ethylene/propylene sequences (PEP) in the xylene cold insoluble fraction (XCI) of the heterophasic propylene copolymer (RAHECO);
fPEE is the mol fraction of propylene/ethylene/ethylene sequences (PEE) and of ethylene/ethylene/propylene sequences (EEP) in the xylene cold insoluble fraction (XCI) of the heterophasic propylene copolymer (RAHECO);
fEEE is the mol fraction of ethylene/ethylene/ethylene sequences (EEE) in the xylene cold insoluble fraction (XCI) of the heterophasic propylene copolymer (RAHECO),
wherein all sequence concentrations being based on a statistical triad analysis of $^{13}$C-NMR data.

7. The heterophasic propylene copolymer (RAHECO) according to claim 1, wherein the xylene cold soluble content (XCS) has
  i) a comonomer content in the range of 36.5 to 50.0 mol-%, and/or
  ii) an intrinsic viscosity (IV) determined according to DIN ISO 1628/1, (in Decalin at 135° C.) in the range of 2.0 to 4.5 dl/g.

8. The heterophasic propylene copolymer (RAHECO) according to claim 1, wherein the random propylene copolymer (R-PP) has
  i) before vis-breaking a melt flow rate MFR$_2$ (230° C.) measured according to ISO 1133 in the range of 3.0 to 8.0 g/10 min, and/or
  ii) a comonomer content in the range of 4.4 to 9.0 mol-%.

9. The heterophasic propylene copolymer (RAHECO) according to claim 1, wherein the comonomers of the random propylene copolymer (R-PP) and/or the comonomers of the elastomeric propylene copolymer (E) are ethylene and/or $C_4$ to $C_8$ α-olefin.

10. The hetreophasic propylene copolymer (RAHECO) according to claim 1, wherein the heterophasic propylene copolymer (RAHECO) comprises 60.0 to 90.0 wt.-% based on the total weight of the heterophasic propylene copolymer (RAHECO), of the random propylene copolymer (R-PP) and 10.0 to 40.0 wt.-%, based on the total weight of the heterophasic propylene copolymer (RAHECO), of the elastomeric propylene copolymer (E).

11. The heterophasic propylene copolymer (RAHECO) according to claim 1, wherein the heterophasic propylene copolymer (RAHECO) has been visbroken.

12. The heterophasic propylene copolymer (RAHECO) according to claim 11, wherein the heterophasic propylene copolymer (RAHECO) has been visbroken with a visbreaking ratio (VR) as defined by in-equation (II)

$$1.5 \leq \frac{MFRfinal - MFRinitial}{MFRinitial} \leq 30.0 \quad (II)$$

wherein
"MFRfinal" is the MFR$_2$ (230° C./2.16 kg) of the heterophasic propylene copolymer (RAHECO) after visbreaking and
"MFRinitial" is the MFR$_2$ (230° C./2.16 kg) of the heterophasic propylene copolymer (RAHECO) before visbreaking.

13. The heterophasic propylene copolymer (RAHECO) according to claim 1, wherein the heterophasic propylene copolymer (RAHECO) has been polymerized in the presence of
  a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound;
  b) optionally a co-catalyst (Co), and
  c) optionally an external donor (ED).

14. The heterophasic propylene copolymer (RAHECO) according to claim 13, wherein
  a) the internal donor (ID) is selected from optionally substituted malonates, maleates, succinates, glutarates, cyclohexene-1,2-dicarboxylates, benzoates and derivatives and/or mixtures thereof;
  b) the molar-ratio of co-catalyst (Co) to external donor (ED) [Co/ED] is 5 to 45.

15. The heterophasic propylene copolymer (RAHECO) according to claim 1, wherein the heterophasic propylene copolymer (RAHECO) comprising a matrix (M) being a random propylene copolymer (R-PP) and an elastomeric propylene copolymer (E) dispersed in said matrix (M) is produced in a multistage process comprising at least two reactors connected in series.

16. The heterophasic propylene copolymer (RAHECO) according to claim 15, wherein
  (a) in a first reactor propylene and ethylene and/or $C_4$ to $C_8$ α-olefin are polymerized obtaining a first propylene copolymer fraction (PP1),
  (b) transferring said first propylene copolymer fraction (PP1) in a second reactor,
  (c) polymerizing in said second reactor in the presence of the first propylene copolymer fraction (PP1) propylene and ethylene and/or $C_4$ to $C_8$ α-olefin obtaining a second propylene copolymer fraction (PP2), said first propylene copolymer fraction (PP1) and said second propylene copolymer fraction (PP2) form the matrix (PP),
  (d) transferring said matrix (M) in a third reactor,
  (e) polymerizing in said third reactor in the presence of the matrix (M) propylene and ethylene and/or $C_4$ to $C_8$ α-olefin obtaining an elastomeric propylene copolymer (E), said matrix (M) and said elastomeric propylene copolymer (E) form the heterophasic propylene copolymer (RAHECO).

17. The heterophasic propylene copolymer (RAHECO) according to claim 1, wherein the heterophasic propylene copolymer (RAHECO) has a flexural modulus measured according to ISO 178 in the range of 300 to 700 MPa.

18. The injection molded article comprising a heterophasic propylene copolymer (RAHECO) according to claim 1.

19. The thin wall packaging, comprising a heterophasic propylene copolymer (RAHECO) according to claim 1.

* * * * *